June 11, 1968 H. G. KRAUT ET AL 3,387,426
APPARATUS AND METHOD FOR PACKAGING
Filed Feb. 2, 1966 7 Sheets-Sheet 1

INVENTOR.
HERMAN G. KRAUT
ALBERT E. LEMAIRE
BY
ATTORNEY

FIG. 2

INVENTOR.
HERMAN G. KRAUT
ALBERT E. LEMAIRE
BY
ATTORNEY

June 11, 1968  H. G. KRAUT ET AL  3,387,426

APPARATUS AND METHOD FOR PACKAGING

Filed Feb. 2, 1966  7 Sheets-Sheet 4

INVENTOR.
HERMAN G. KRAUT
ALBERT E. LEMAIRE

BY

ATTORNEY

FIG. 5

INVENTOR.
HERMAN G. KRAUT
ALBERT E. LEMAIRE
BY
ATTORNEY

United States Patent Office 3,387,426
Patented June 11, 1968

3,387,426
APPARATUS AND METHOD FOR PACKAGING
Herman G. Kraut, New Britain, and Albert E. Lemaire,
Wallingford, Conn., assignors to The Stanley Works,
New Britain, Conn., a corporation of Connecticut
Filed Feb. 2, 1966, Ser. No. 524,623
45 Claims. (Cl. 53—22)

The present invention relates to packaging of articles between synthetic plastic sheet material and a permeable substrate such as paperboard, and more particularly, to an improved process and apparatus for packaging a multiplicity of items on a master substrate and obtaining individually packaged items therefrom.

Various types of packaging processes have been proposed for encasing articles between a transparent or translucent synthetic plastic sheet material and a substrate such as paperboard, including a technique known as blister packaging wherein a thermoplastic sheet material is formed into a predetermined configuration in a mold and thereafter adhesively secured to a substrate, and skin-packaging wherein a thermoplastic sheet material is drawn about the product into a tight-fitting sheath and concurrently bonded to the substrate by either its own substance or by an intermediate coating of adhesive applied either to the substrate or to the film. In an effort to reduce the cost of such packaging processes and to expedite operation, it is desirable to employ a large master card or substrate which is capable of being subdivided into a multiplicity of individual packages and to so dispose the articles upon the substrate as to register with the individual packages to be severed therefrom. This technique has been particularly adapted to skin-packaging wherein the film is drawn over the entire master substrate or card to provide an assembly which is thereafter severed into individual packages. The technique may be similarly adapted to blister packaging by providing a suitable female die or platen to receive the individual blisters, placing the articles within the blisters and thereafter adhering the flanges of the blisters to the master card or substrate by adhesive or other suitable means.

Various means have been employed or proposed for severing the assemblies of a multiplicity of items on a master card into individual packages. Hand cutting or slitting has been employed for small scale operations. Die cutting has been employed and a highly desirable embodiment of this technique is illustrated in Kraut United States Patent No. 3,178,976, granted Apr. 20, 1965. Guillotine and hot wire cutters, and driven cutting wheels have been utilized in various combinations but generally some manual activity has been required during cutting or trimming of the cards.

Moreover, it is customary in skin-packaging processes (and presumably in a master card blister-packaging process) to utilize an air-permeable try upon which the substrate is placed and the article loaded. This tray is then conveyed or inserted into the heating section of the packaging apparatus after which it is removed. The insertion or removal of the tray or both may be manual, as may be the transportation of the assembly of the master card, thermoplastic sheeting and items therefrom.

It is an object of the present invention to provide a novel and highly automated packaging apparatus which permits substantial reduction in labor required for mass packaging in skin or blister processes.

It is also an object to provide such apparatus which is adapted to a relatively compact installation, highly rugged in construction, and adapted to ready modification for different types and sizes of packages.

Another object is to provide a novel and highly automated method for packaging to reduce substantially the labor requirements for high volume skin-packaging.

Still another object is to provide a packaging apparatus and method wherein an air-permeable tray is automatically fed and discharged from an elevatable platen in the heating section of the apparatus.

A further object is to provide a packaging method and apparatus wherein a master card is automatically cut and trimmed into individual packages.

Other objects and advantages will be readily apparent from the following detailed description and the attached drawings wherein.

It has now been found that the foregoing and related objects can be readily attained in a packaging installation including a thermal packaging unit having a platen which may be elevated and lowered between upper, lower and intermediate positions and means for supporting a length of synthetic thermoplastic sheet material adjacent its margins in a position overlying the platen in the elevated position thereof. A heating unit is provided above the sheet material supporting means for heating sheet material supported therein to plasticity and means are provided for drawing suction through the platen so that film which has been heated to plasticity may be deformed about articles supported on an air-pervious substrate carried by an air-pervious tray member on the platen during operation of the installation. The thermal apparatus includes first guide means registering with the intermediate position of said platen for supporting a tray member thereon and second guide means registering with the lower position of the platen also for supporting a tray member thereon. Means are provided for moving the first guide means to an inoperative position to permit a tray member supported on the platen to be lowered thereby onto the second guide means and means are provided adjacent the lower position of the platen and the second guide means for discharging a tray member supported on the second guide means. The packaging installation also includes a conveyor assembly having an upper track registering with a first guide means for supplying a tray member to the first guide means of the thermal apparatus and a lower track registering with the second guide means for receiving a tray member discharged from the thermal apparatus by the dischage means to return the tray member to the opposite end thereof. At the opposite end of the conveyor assembly is an elevator movable between the lower track and upper track for elevating a tray member returned by the lower track to the level of the upper track. Extending to one side of the thermal apparatus is a conveyor and cutting assembly including means for withdrawing a packaging assembly from the support means of the thermal apparatus and advancing the packaging assembly along the length thereof. Means are provided for severing the thermoplastic sheet material between the substrates of individual packaging assemblies and a plurality of rotatable slitting members are provided for slitting the packaging assembly along its length as it is advanced thereby together with means for operating the slitting member. Cutting means are provided for making at least one cut transversely of the packaging assembly passing along the conveyor and cutting assembly, thus enabling cutting and slitting of the packaging assembly into a multiplicity of individual packages. The packaging installation also includes power means for operating the various elements thereof and control means for controlling the operation of said elements to produce timed interrelationship thereof.

Although the installation of the present invention may be utilized with various packaging processes including blister packaging wherein a preformed blister is adhesively bonded to a substrate depending upon the operation of the thermal apparatus, it has been found particularly effective for use in skin packaging processes. In United States Patent No. 3,031,072, granted Apr. 24, 1962, and entitled Package and Method of Forming Same, there is described a package having an article supported on a paperboard substrate and sheathed by a thermoplastic film which is drawn thereabout and bonded to the substrate about the article by its own substance. A similar method and article additionally employing an adhesive coating has been widely utilized both prior and subsequent to the invention of the aforementioned patent. This adhesive technique is described in many United States patents, including No. 2,855,735, granted Oct. 14, 1958 and No. 2,861,405, granted Nov. 25, 1958.

In such skin packaging processes a length of synthetic thermoplastic sheet material is supported adjacent its margins in a position overlying the assembly of the substrate, article and tray member and suction is drawn through the tray member and substrate to draw the film about the article and into engagement with the upper surface of the substrate about the article to form the skin packaging assembly. Desirably the thermal apparatus includes means for blowing air upwardly through the substrate to assist in releasing the packaging assembly from the tray member, particularly when locating members are employed which project from the tray member through the paperboard substrate.

Although adhesive coatings or laminates may be used on the substrate or the film, the method of the aforementioned United States Patent Number 3,031,072 is preferably used for optimum economy and most facile operation. Accordingly, the substrate is paperboard or like material which is porous and substantially imperforate through the area of laminar contact between film and paperboard to ensure firm, substantially uniform bonding therebetween. However, incidental perforations may also be incorporated for purposes of hanging the packages, or for tearing the substrate by the user, etc. Where an adhesive coating or laminate is employed to effect the bond, the substrate may be non-porous and the area of surface contact may contain perforations as are often utilized to permit drawing of a vacuum therethrough. In either instance, the substrate should be of sufficient rigidity for the packaging application.

The ideal substrates are porous paperboard sheet material which will permit the drawing of a vacuum therethrough and which preferably are free from an adhesive coating and desirably are only lightly calendered to preserve the inherently porous, gas-permeable nature throughout. A suitable paperboard stock, for example, is the type known in the trade as "patent coated" which has a face or top layer composed essentially of virgin pulp and high-grade waste free of ground wood and presenting an attractive finish and appearance. Alternatively, other types of porous paperboard sheet material may be readily employed, including corrugated board albeit at greater expense. In the event a colored background or base color is to be used to provide an attractive appearance, it is most desirable to select a paperboard material which has been vat-dyed with the desired color during its manufacture so as to eliminate the necessity for printing the background color upon the paperboard.

When the bonding of the film to the paperboard is by the substance of the film itself, as set forth in the aforementioned United States Patent Number 3,031,072, care should be taken to select printing inks for the paperboard which will not interfere with the bonding process since certain inks contain sufficiently high quantities of binders or fillers to interfere with the porosity of the paperboard stock or to otherwise interfere with the bonding operation.

In accordance with the teachings of this patent, the film is a polyolefin which has at least the surface for bonding to the substrate treated so as to render the film heat-sealable by its own substance upon the application of heat while maintaining substantially the integrity of the body of the film. As fully defined in this patent, the term "surface-treated polyolefin film" refers to polyolefin films having one or both surfaces at least partially oxidized or surface-treated to render the surface more susceptible to activation by heat than the body of the film.

The films utilized for the present invention may be of a thickness of about 2–11 mils, and preferably about 3–7 mils, depending upon the degree of distention or draw required to form the sheath about the article.

The suction applied to the bottom of the substrate should be sufficient to distend the film about the articles and to draw the film into tight surface contact with the substrate. In the instance of the method of the aforementioned United States Patent Number 3,031,072, the suction should be sufficient to draw the surface of the film into the pores of the paperboard. In a commercial embodiment, suction rated at about 23 inches of mercury (about 11.5 pounds per square inch) has proven highly satisfactory. The actual amount of suction required will vary with the permeability or porosity of the paperboard substrate and the conditions of operation. Generally, the suction is applied for about two to twenty seconds to bring the film and substrate into laminar engagement, a period of three to five seconds being satisfactory for most operations.

In order to render the machine substantially automatic in operation, a plurality of sensing units are enclosed within the control means and are actuatable by movement of the tray member or movement of one of the other elements of the installation. The operating means includes a drive unit to operate the means for moving the first guide means to an inoperative position and the control means includes a sensing unit having a first switch which is actuatable by movement of the platen for operating the drive unit to move to the inoperative position and a second switch which is also actuatable by movement of the platen to return the guide means to the operative position.

For discharging the tray member when it is supported on the second guide means, the operating means includes a drive unit which operates the tray discharging means and a sensing unit which is actuatable by movement of the platen to operate the drive unit for discharging the tray member. A second sensing unit is desirably provided on the lower track and is actuated by movement of a tray member passing therealong after having been discharged from the second guide means so that it will operate the drive unit to return the discharging means to inoperative position.

The control means also includes a sensing unit on the upper track which is actuated by movement of a tray member passing therealong on its way to the thermal apparatus and which operates the operating means for the elevator to lower the platform to the level of the lower track. To automatically raise the elevator platform to the level of the upper track upon seating of a tray member thereon returned along the lower track, the elevator has a sensing unit which is actuated by movement thereonto of the tray member so as to actuate the operating means and effect such movement of the platform to the level of the upper track.

Since the lower conveyor track is desirably inclined to automatically return the tray members largely by gravity, a stop assembly is pivotably mounted on the conveyor assembly at the end of the lower conveyor track adjacent the elevator which will engage a tray member returned therealong in the event that the elevator platform is not at the level of the lower conveyor track to receive the tray member. The stop assembly is biased upwardly in its normal position and has means thereon for engaging the tray member in the upwardly biased position so as to prevent movement of the tray member thereby and also includes means thereon engageable by the elevator platform during the lowering thereof to depress the stop assembly against the biasing pressure and to render the tray engaging means inoperative to permit a tray member to pass thereover and onto the elevator platform. Desirably the stop assembly includes at least one driven roll which is frictionally engageable with the bottom surface of a tray member passing thereover to slow the tray member and to drive the tray member onto the platform of the elevator into a predetermined position.

The means for withdrawing and advancing the packaging assembly includes a plurality of pressure roll assemblies spaced therealong and each of the assemblies includes a pair of overlying shafts, a base roll carried by the lower of the shafts and a plurality of pressure rolls spaced along the length of the upper of the shafts which are adapted to engage the upper surface of the packaging assembly between the articles placed thereon. Although both of the shafts may be driven, effective operation can be readily attained by driving only one of the shafts which preferably is the lower shaft carrying the base roll. The pressure rolls are advantageously adjustably mounted on the upper shaft so as to permit variation in the spacing therebetween to accommodate variations in spacing between the articles of the packaging assemblies. Since variation in the thickness of the packaging assemblies may occur depending upon the thickness of the substrate, each of the pressure roll assemblies desirably includes means for varying the pressure upon the upper shafts and thereby upon the packaging assembly passing therethrough. Conveniently, this is accomplished by a pressure block bearing support for the ends of the upper shaft.

Since the packaging assembly will generally be supported by the clamping elements prior to discharge from the thermal apparatus, it is desirable to rapidly withdraw the packaging assembly upon release of the thermoplastic sheet material immediately upon release of the thermoplastic sheet material therebetween. Accordingly, the control means is operable to initiate operation of the means for withdrawing the packaging assemblies to pretension the sheet material extending therethrough from the thermal apparatus prior to operation of the sheet material supporting means to release the sheet material from engagement therewith. In this manner, a pretensioned sheet material is rapidly drawn toward the withdrawing means of the conveyor upon disengagement of the sheet material from the supporting means. Such operation may be further enhanced by providing a spring-loaded bar or similar means for applying upward pressure upon the thermoplastic sheet material adjacent the leading edge of the packaging assembly.

To accommodate variations in length of the packaging assemblies passing along the conveyor and cutting assembly, at least one of the pressure roll assemblies is desirably adjustable in spacing with respect to adjacent pressure roll assemblies.

Since punched cutouts are oftentimes desirable in the individual packages, it is advantageous to include punching means operable with the second cutting means so as to simultaneously punch the desired cutouts. If so desired, a second punching assembly may be provided along the length of the conveyor and cutting assembly to punch holes at the same or a different location in the packaging assemblies passing therealong.

For effecting the severing of the thermoplastic sheet material between individual packaging assemblies, the first cutting means desirably includes a platform on the conveyor and cutting assembly having an aperture extending transversely thereof and over which the packaging assemblies extend. A wire-like member extends across the conveyor and cutting assembly above the aperture in the platform and means are provided for heating the wire-like member to a temperature sufficient to cut the thermoplastic sheet material. Means are provided for depressing the wire-like member into the aperture so as to cut through the thermoplastic sheet material, and the control means includes a sensor on the conveying and cutting assembly which is actuatable by a packaging assembly passing therealong to stop its movement and depress the member.

In accordance with the preferred aspect of the present invention, the control means for operating the second cutting means is responsive to lineal movement of the packaging assemblies, conveniently effected by measuring the rotation of the slitter discs or back-up roll of the slitting members. Accordingly, the control means desirably includes a sensor on the cutting and conveying assembly adjacent the slitting members to effect rotation thereof upon sensing the leading edge of the packaging assembly. In this manner, the slitting members will rotate only during the movement of a packaging assembly therebetween.

In order to effect withdrawal of the packaging assemblies past the second cutting means and to enable a final trim cut adjacent the trailing edge of the packaging assembly, the withdrawing means includes a pressure roll assembly to the side of the slitting members and second cutting means opposite from the thermal apparatus. In this manner, this pressure roll assembly engages the packages as they are being advanced therethrough and continues to move them along past the second cutting means and desirably to discharge onto a take-off conveyor.

In the copending United States application of Herman G. Kraut, Serial No. 314,202, filed October 7, 1963, there is disclosed a method of skin packaging wherein the paperboard substrate is initially pressed onto a tray member having upstanding projections such as pins or blades thereon so that the projections extend through the substrate and provide a means of positioning articles which would tend to roll. The thermoplastic film is drawn downwardly about the articles and the projections to form the sheaths and bond to the surface of the substrate. To facilitate separation of the packaging assembly thus formed from the projections, air under pressure is blown upwardly through the tray member and against the bottom surface of the packaging assembly which tends to lift the skin packaging assembly upwardly off the projections. The blowing of air preferably coincides with the initial lowering of the platen so that the two movements tending to separate the packaging assembly from the projections occur contemporaneously although the blowing of air may commence prior to the lowering of the platen. Desirably a line pressure of 20–150 pounds is employed.

Referring now in detail to the attached drawings, a packaging installation embodying the present invention includes an elevator section generally designated by the numeral 2, a conveyor section extending therefrom and generally designated by the numeral 4, and a thermal apparatus at the end of the conveyor section 4 which is generally designated by the numeral 6. Extending from one side of the thermal apparatus 6 is the cutting and trimming section generally designated by the numeral 8 which feeds the trimmed packages to the take-off conveyor 10.

As best seen in FIGURES 1–4, the thermal apparatus 6 has a frame 12 within which is mounted an air-permeable platen 14 which is elevated and lowered therein by the piston 16 of the air motor 18. Spaced above the platen 14 are clamping elements 20, 22, the lower clamping element 20 being mounted upon the frame 12 in stationary position and the upper clamping element 22 having its four corners carrying racks 24 which mesh with pinions 26 mounted on the frame 12. In this manner, the upper clamping element 22 is movable in a controlled attitude relative to the lower clamping element 20 by the pistons 27 of the four air motors 28 at the corners thereof which are mounted on the frame 12. Film 36 from the supply roll 38 which is rotatably mounted on the brackets 40 on one side of the frame 12 is fed between the clamping elements 20, 22 and extends therethrough to the cutting and trimming section 8.

Spaced above the clamping elements 20, 22 and mounted for sliding movement on the tracks 30 is a heater 32 which is movable inwardly and outwardly over the clamping elements by the piston 33 of the air motor 34. When energized, the heater 32 is adapted to heat to plasticity the film 36 in the clamping elements 20, 22. In this manner, the film 36 may be deformed by suction drawn through the air-permeable platen 14 by the line or hose 42 when it is moved upwardly adjacent the clamping elements 20, 22 on the piston 16 of the air motor 18.

Each of the clamping elements 20, 22 is of generally rectangular configuration and includes bars 21 which have slots 23 adjacent the ends thereof which slidably seat end portions 25 of reduced width on the ends of the bars 29 so that the spacing therebetween may be varied and the bars 29 are locked in adjusted position by fasteners 31. In this manner, the length of film which is clamped may be varied depending upon the length of the substrate being utilized for the package. If so desired, additional bars parallel to the bars 21 may be slidably seated in similar fashion in the bars 29 to permit adjustment for various widths of film and substrates.

Figure 2:
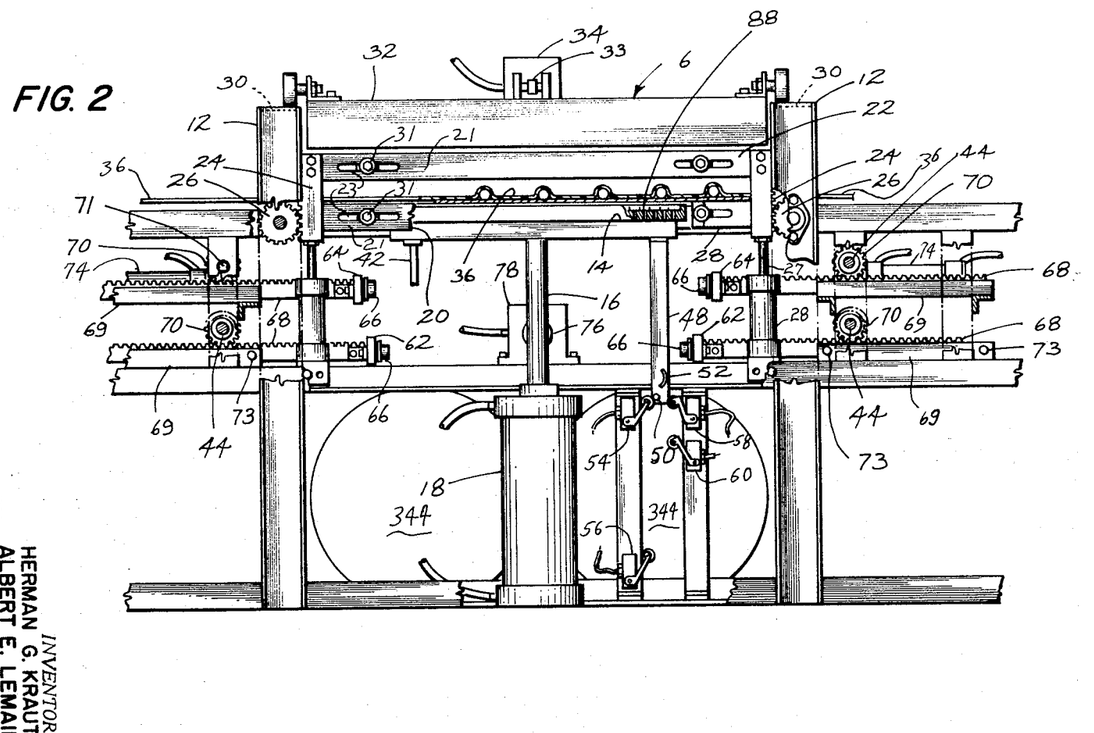
FIGURE 2 is a front elevational view to an enlarged scale of the thermal apparatus of FIGURE 1 with portions thereof broken away for clarity of illustration and with the elements illustrated in the position thereof shortly after the thermoforming operation has been completed.
Figure 3:
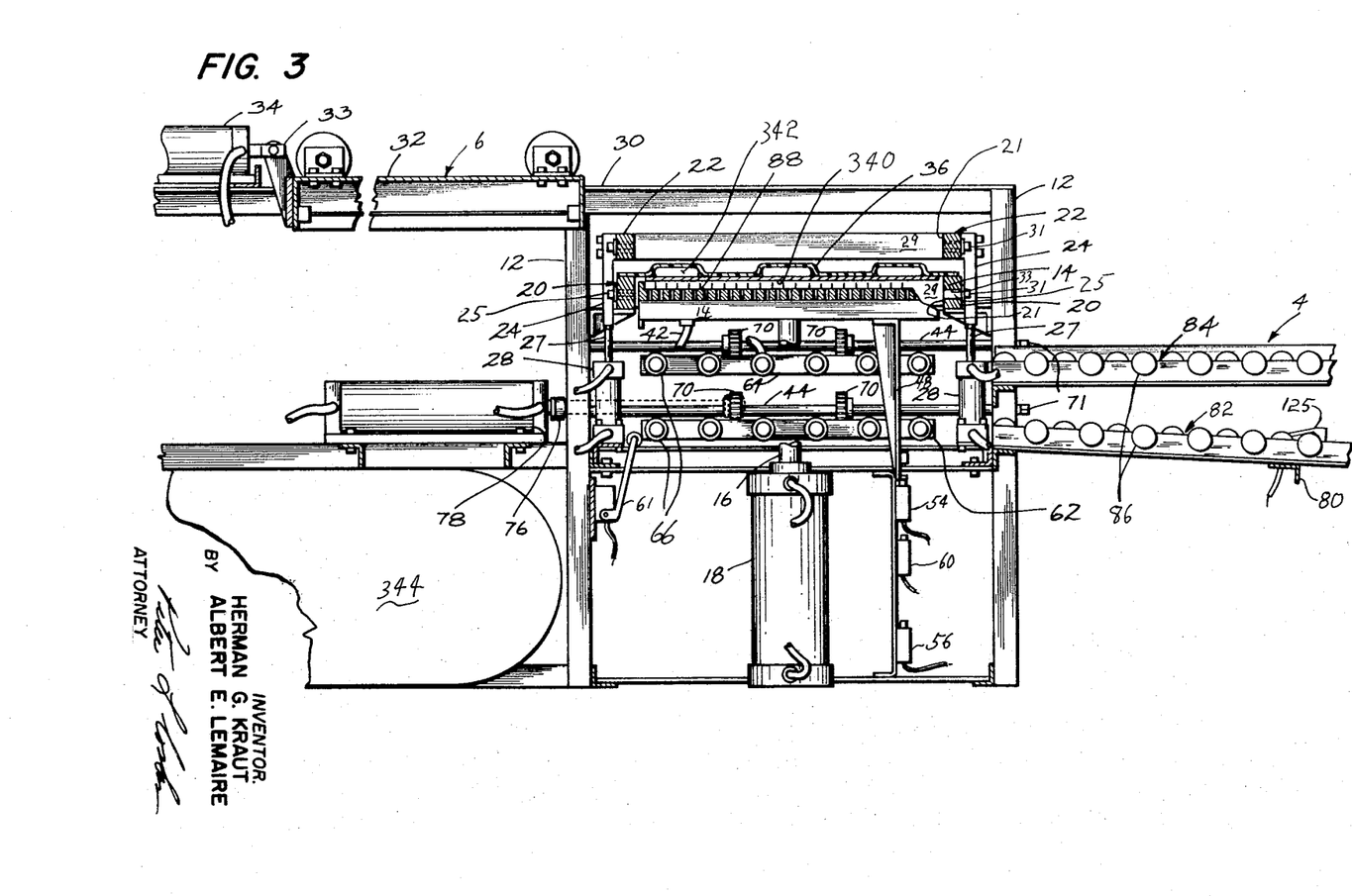
FIGURE 3 is a sectional view to an enlarged scale along the line 3—3 of FIGURE 1.

As best seen in FIGURE 2, depending from the front of the platen 14 is a leg 48 which has adjacent the lower end thereof, a cam pin 50 and a cam plate 52. As the platen 14 is raised and lowered, the cam pin 50 and cam plate 52 strike and actuate switches 54, 56, 58 and 60 which are mounted on the frame 12, for a purpose to be described fully hereinafter. As seen in FIGURE 3, a switch 61 is mounted on the frame 12 adjacent the rear of the platen 14.

Mounted on the frame 12 for movement inwardly and outwardly relative to the platen 14 are a lower pair of support or guide bars 62 and an upper pair of support or guide bars 64. Both pairs of support bars 62, 64 rotatably mount a plurality of guide rollers 66 having their axes of rotation perpendicular to the conveyor section 4. Both pairs of support bars 62, 64 are mounted on arms 68 slidably supported in tracks 69 on the frame 12 and have gear-toothed rack-like upper surfaces which mesh with the pinion gears 70 which are rotatably mounted on the frame 12 by the shafts 44 which extend outwardly of the frame 12 for rotation by a suitable tool to move the bars 62, 64 closer or further apart as may be desired. The arms 68 of the lower support bars 62 may be locked in adjusted position on the tracks 69 by set screws 73. In addition to the adjusting movement which may be effected by application of a suitable tool to the hexagonal end portions 71 on the shafts, the upper support bars 64 are movable by the pistons 75 of the air motors 74 which are slidably mounted in the tracks 77 for adjustment of the spacing of the bars 64 and which may be locked in position therein by the set screws 79.

As best seen in FIGURE 2, a pusher bar 76 is provided by the piston of the air motor 78 which is mounted on the apparatus frame 12 in a position generally registering with the lower pair of support bars 62 for a purpose to be described hereinafter.

Turning now to the conveyor section 4 of the installation, this includes a frame 80 which supports a lower conveyor track generally designated by the numeral 82 and an upper conveyor track generally designated by the numeral 84. In accordance with conventional construction for such conveyors, they include a multiplicity of rollers 86 to facilitate movement of members therealong and the upper conveyor track 84 is generally horizontal and extends toward the thermal apparatus 6 and the lower conveyor track is generally inclined away from the thermal apparatus 6. The upper conveyor track 84 registers with the upper support bars 64 of the thermal apparatus 6 and the lower conveyor track 84 registers with the lower support bars 62. In this manner, an air-pervious tray 88 is transported on the upper conveyor track 84 onto the rollers 66 of the upper support bars 64 and is returned from the lower support bars 62 of the thermal apparatus 6 along the lower conveyor track 82.

Figure 7:
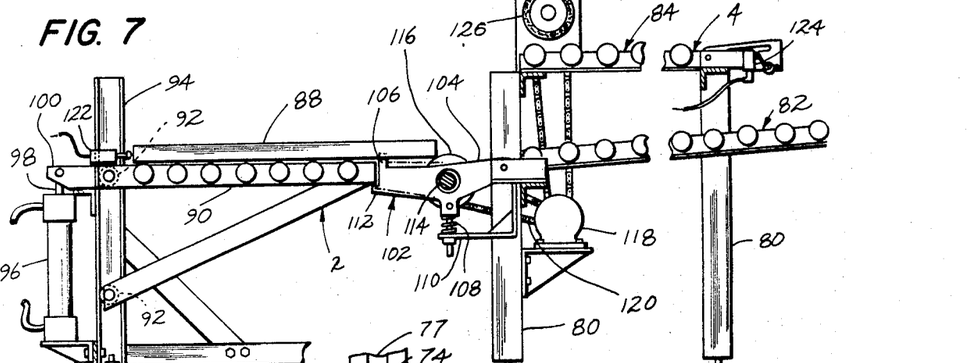
FIGURE 7 is a fragmentary side elevational view to an enlarged scale of the loading and return sections of the installation of FIGURE 1.

At the feed end of the conveyor section 4 is the elevator section 2 which has a platform 90 mounted for vertical sliding movement by rollers 92 in the upright tracks or channels 94 in response to operation of the air motor 96 which has its piston 98 connected to the arm 100 of the platform 90. As seen in FIGURE 7, the frame 80 of the conveyor section 4 supports a pivotable stop assembly generally designated by the numeral 102 provided by arms 104 which are pivoted at one end on the frame 80 and which have an upstanding shoulder portion 106 at the other end adjacent the elevator section 2. The arms 104 are biased upwardly by the springs 108 which operate therebetween and brackets 110 on the frame 80. Projecting horizontally from the lower ends of the arms 104 are fingers 112 which are engageable by the end of the platform 90 as it moves downwardly to pivot the stop assembly 102 downwardly. In the normal position of the stop assembly 102, the free ends of the arms 104 (as illustrated in phantom line in FIGURE 7) through springs 108 are biased upwardly so that the shoulder portions 106 will act as a stop for a tray 88 being returned along the lower conveyor track 82 in the event that the elevator platform 90 is not in position to receive it.

Rotatably supported in brackets 105 on the frame 80 and freely extending through elongated slots in the arms 104 is a shaft 114 upon which are mounted large rubber wheels 116 and which is driven by the motor 118 through the gear and sprocket unit 120. The motor 118 drives the wheels 116 at a relatively slow speed so that a tray 88 returning rapidly along the inclined conveyor track 82 will be slowed thereby. The driven wheels 116 ensure that a tray 88 being returned along the lower conveyor track 82 will be frictionally driven onto the platform 90 and against the switch 122 on the frame of the elevator section 2 to supply air to the motor 96 and elevate the platform 90 and tray 88 to the level of the upper conveyor track 84. As the platform 90 is elevated, the free ends of the arms 104 of the stop assembly 102 pivot upwardly to engage any tray 88 that might be returned while the platform 90 is in the elevated position.

Mounted on the conveyor frame 80 along the upper conveyor track 84 is a switch 124 which is operated by a tray 88 passing thereby on its way to the thermal apparatus 6 to actuate the air motor 96 and lower the elevator platform 90 to a position registering with the lower conveyor track 82 to receive a tray 88 returned thereby. Rotatably mounted on the frame 80 in spaced position above the upper conveyor track 84 adjacent the elevator section 2 is an elongated rubber roller 126 which may be used to press a paperboard or like substrate onto a tray 88 having upwardly projecting pins or locating elements (not shown) to cause them to project through the paperboard substrate and serve to position articles thereon. On the conveyor frame 80 along the lower conveyor track 82 adjacent the thermal apparatus 6 is a switch 125 which is operable by a tray 88 passing thereby to actuate the air motor 78 of the pusher bar 76 to cause it to retract.

Referring now in detail to the cutting and trimming section 8, adjacent the thermal apparatus 6 is a transfer frame generally designated by the numeral 127 having two pairs of upright channel members 130, 132 connected by the horizontal rails 128. Rotatably mounted in the upper portions of the pairs of upright channel members 130, 132 below the upper surface of the rails 128 on shafts 134, 135 are elongated rolls 136, 137. Supported on one end of the shafts 134, 135 are cooperating sprockets 138, 139 and on the other end of the shaft 135 is also mounted a sprocket 141 and an air clutch 140. Extending between the sprockets 138, 139 of the shafts 134, 135 is a sprocket chain 142.

Slidably mounted on the inside of the uprights 130, 132 are blocks 144 which have journalled therein the ends of the shafts 146, 148 upon which are mounted in spaced relationship along the length thereof a multiplicity of pressure rolls 150 of relatively small axial length. The rolls 150 may be adjusted along the length of the shafts 146, 148 and locked in place by set screws (not shown) in their hub portions to accommodate varying widths between articles of a packaging assembly passing thereby. The pressure at the nip or contact area between the peripheries of the pressure rolls 150 and the elongated rolls 136, 137, and thereby the pressure exerted upon a packaging assembly passing therebetween, can be adjusted by turning the adjusting bolts 152 which are seated in the plates 153, 155 at the top of the channel members 130, 132. As the bolts 152 are turned to depress or permit increase in the spacing of the blocks 144 from the shafts 134, 135, greater or lesser pressure is applied to the nip through the blocks 144 against the biasing pressure of the springs 154 which are retained between the collar 157 and the blocks 144. Extending between the rolls 136, 137 and slightly below the uppermost surface thereof, and terminating shortly before the periphery thereof, is a platform element 159 which provides a support surface between the rolls 136, 137.

Adjacent to the transfer frame 127 is the slitter frame generally designated by the numeral 156 which includes two spaced pairs of upright channel members 158, 160 connected by channel-shaped rails 162. Slidably mounted for movement on the rails 162 adjacent the transfer frame 127 is the roll support 164 which is movable longitudinally of the frame 156 by rotation of the hand wheels 166. As can be seen, the hand wheels 166 are mounted on shafts 167 which are threadably mounted in the upright brackets 168 on the punching assembly generally designated by the numeral 326, and the roll support 164 has depending lugs (not shown) which seat slidably in elongated slots (not shown) in the upper flange of the rails 162. As the hand wheels 166 are turned, the shafts 167 rotate in the roll supports 164 while threadably moving in the brackets 168, thus increasing or decreasing the spacing between the roll supports 164 and the roll 137 in the transfer frame 127 to accommodate varying lengths of packaging assemblies.

Rotatably mounted in journal blocks 190 in the roll support 164 which are below the upper flange of the rails 162 is a shaft 172 which carries thereon the elongated roll 173. Above the rails 162, the roll support 164 slidably mounts adjustable blocks 174 which have journalled therein the ends of the shaft 176 which has mounted in spaced relation over the length thereof a multiplicity of pressure rolls 178 which may be adjustably positioned along the length thereof as in the case of the rolls 150. The pressure between the pressure rolls 178 and the roll 173 similarly is adjustable by the assembly of the adjusting screw 180 and spring 182.

Mounted on the bracket 183 of frame 156 below the rails 162 is a drive unit 184 which is connected to a power transfer assembly 186 by a sprocket chain 188, and the power transfer assembly 186 in turn is connected to a sprocket on an air clutch (not shown) on the end of the shaft 172 by the chain 191. In addition, a sprocket chain 194 extends between the power transfer assembly 186 and the sprocket of the air clutch 140 on the shaft 135 so that the elongated rolls 136, 137 and 172 are all driven thereby with clutching action at the termination of operation of the motor 184 being provided by the several clutches.

Figure 5:
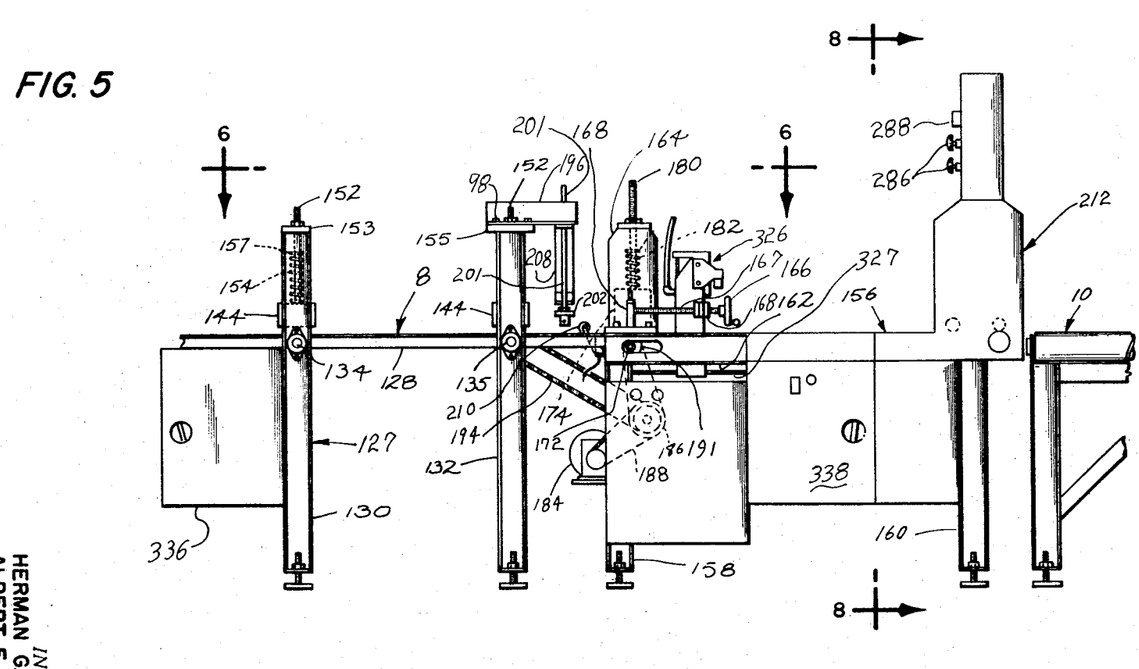
FIGURE 5 is a fragmentary front elevational view to an enlarged scale of the transfer and cutting sections of the apparatus of FIGURE 1.
Figure 6:
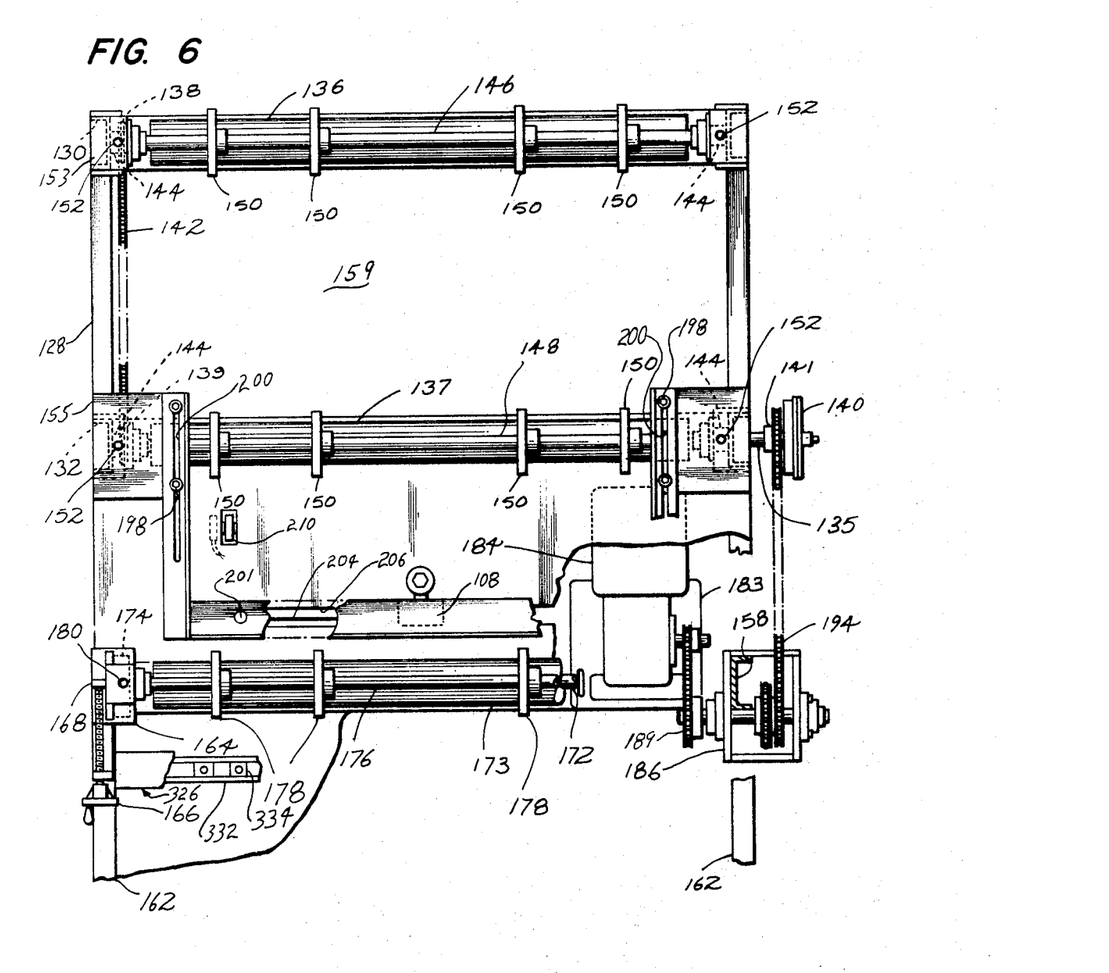
FIGURE 6 is a plan view to an enlarged scale of a portion of the transfer and cutting section of the installation with portions broken away and in phantom line for clarity of illustration.

On the plates 155 of the uprights 132 is the hot wire support bracket 196 which may be slidably adjusted thereon longitudinally of the frame 156 by means of the threaded fasteners 198 which extend through the elongated slots 200 into engagement with the plates 155. As best seen in FIGURE 5, the support bracket 196 has slidably mounted in the ends thereof shafts 201 which support at their lower ends the mounting member 202 which has at its ends insulators (not shown) between which extends a wire-like member 204 of relatively high resistance material so that an electric current passing therethrough will heat it to a temperature sufficient to cut through a sheet of thermoplastic material. One or both ends of the member 204 are tensioned by springs (not shown) so that tautness may be maintained despite thermal expansion. The mounting member 202 may be moved downwardly so as to cause the wire-like member 204 to pass into a slot 206 in the platform 159 by means of an air motor 208 which is mounted on the frame member 196 and which has its piston engaged with the mounting member 202.

Actuation of the air motor 208 to momentarily depress the mounting bar 202 and wire-like member 204 is effected by the switch 210 which utilizes a pair of roller elements so as to make or break contact upon passage thereby of a relatively thick sheet of nonconductive material such as the paperboard substrate. It would be appreciated that such a switch may be used to sense the leading edge or the trailing edge of the packaging assembly. Although the current may pass continually through the wire-like member 204 during operation of the installation to simplify operation, impulse heating is desirably employed and actuated by the switch 210.

Figures 8, 9:
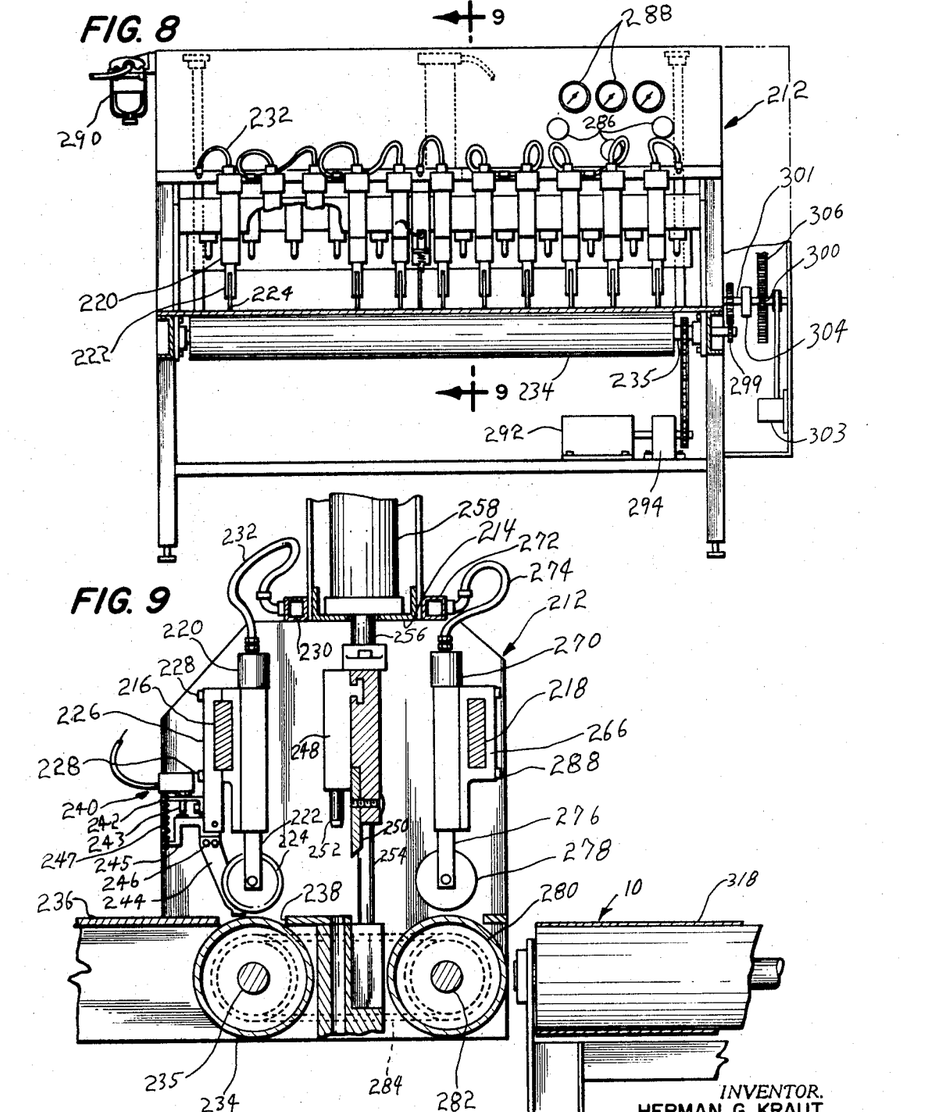
FIGURE 8 is a sectional view to an enlarged scale along the line 8—8 of FIGURE 2 with a portion broken away for clarity of illustration.
FIGURE 9 is a fragmentary sectional view to an enlarged scale along the line 9—9 of FIGURE 8.

Adjacent the far end of the frame 156 is a superstructure generally designated by the numeral 212 and having a top bar 214 and front and rear bars 216, 218. Mounted on the front bar 216 are a plurality of air cylinders 220 which have rotatably mounted on the pistons 222 thereof slitter discs 224 which have a knife-like edge. As can be seen, the air cylinders 220 may be adjusted along the length of the front bar 216 to accommodate various widths of packaging cuts and locked in place by the clamping bars 226 and threaded fasteners 228. Air is supplied thereto from the conduit 230 through the hoses 232 to control and establish the pressure applied by the slitter discs 224 to the packaging assembly passing therethrough and against the surface of the back-up roll 234 which is mounted on the shaft 235. As can be seen in FIGURE 9, the platform 236 of the frame 156 upon which the packaging assembly is travelling has a transverse slot or aperture 238 in which the periphery of the roll 234 is disposed for contact with the slitter discs 224.

Also mounted on the front bar 216 is a sensing unit or switch generally designated by the numeral 240 for sensing the leading edge of a packaging assembly so as to actuate the drive mechanism for the roll 234 and to initiate a further cutting cycle as will be explained more fully hereinafter. As seen in FIGURES 8 and 9, the sensing unit 240 has a mounting bracket 242 on the front bar 216 which supports the fixed contact and switch body 243 and which has pivotably mounted thereon the movable contact arm 245. Depending from the contact arm 245 is the sensing finger 244 which extends down to the level of the platform 236, and the precise location of the forward edge of the finger 244 may be adjusted by slots (not shown) therein and the fasteners 246 which couple it to the contact arm 245 so that actuation of the operation may be adjusted to suit the needs of a particular packaging assembly and sequence to cuts. Normally the contact arm 245 is biased into contact with the fixed contact and switch body 242 by the spring 247 but the thickness of a packaging assembly passing thereby will produce pivoting of the finger 244 and thereby the contact arm 245 so as to open the contacts and operate the drive mechanism, this action terminating upon passage of the packaging assembly thereby.

Below the top bar 214 is a cutting assembly generally designated by the numeral 248 which has at its lower end an elongated blade member 250 and a plurality of punches 252 spaced along the length thereof. The cutting assembly 248 is slidably supported for vertical movement on the guide shafts 254 which extend upwardly through apertures in the top bar 214 and seat on the frame 156. The cutting assembly 248 is moved upwardly and downwardly by the piston 256 of the air cylinder 258 which is fixedly mounted in the superstructure 212 above the top bar 214. As seen in FIGURE 9, the punches 252 register with a multiplicity of holes 260 spaced along the length of the bed plate 262 so that they may extend thereinto to punch apertures at desired locations in the packaging assembly, and the blade member 250 has the point of its blade edge aligned with the surface 264 of the bed plate 262 so that the packaging assembly may be sheared adjacent the edge of the platform 236.

Mounted on the rear bar 218 for adjustable movement therealong by the clamps 266 and fasteners 268 are a multiplicity of air cylinders 270 which are connected to the conduit 272 by the hoses 274. The pistons 276 of the cylinders 270 rotatably support at their lower ends the pressure wheels 278 which cooperate with the elongated roll 280 to apply pressure to a package passing therebetween and to advance it to the conveyor 10. As can be seen in FIGURE 9, the elongated roll 280 has its periphery in alignment with the platform 236 and is mounted on the shaft 282 which is drivingly connected with the shaft 235 by the chain 284.

As will be appreciated the pressure exerted by the pressure wheels 278, the slitter discs 224 and the cutting assembly 248 may be adjusted by varying the pressure into the air cylinders 270, 220 and 258 respectively. Hand controls 286 and gauges 288 for the various air cylinders are shown on the front of the superstructure 212 in FIGURE 8, and air is supplied therethrough to the conduits 230 and 272 and the cylinder 258 from the coupling and filter 290.

Figures 1, 10:
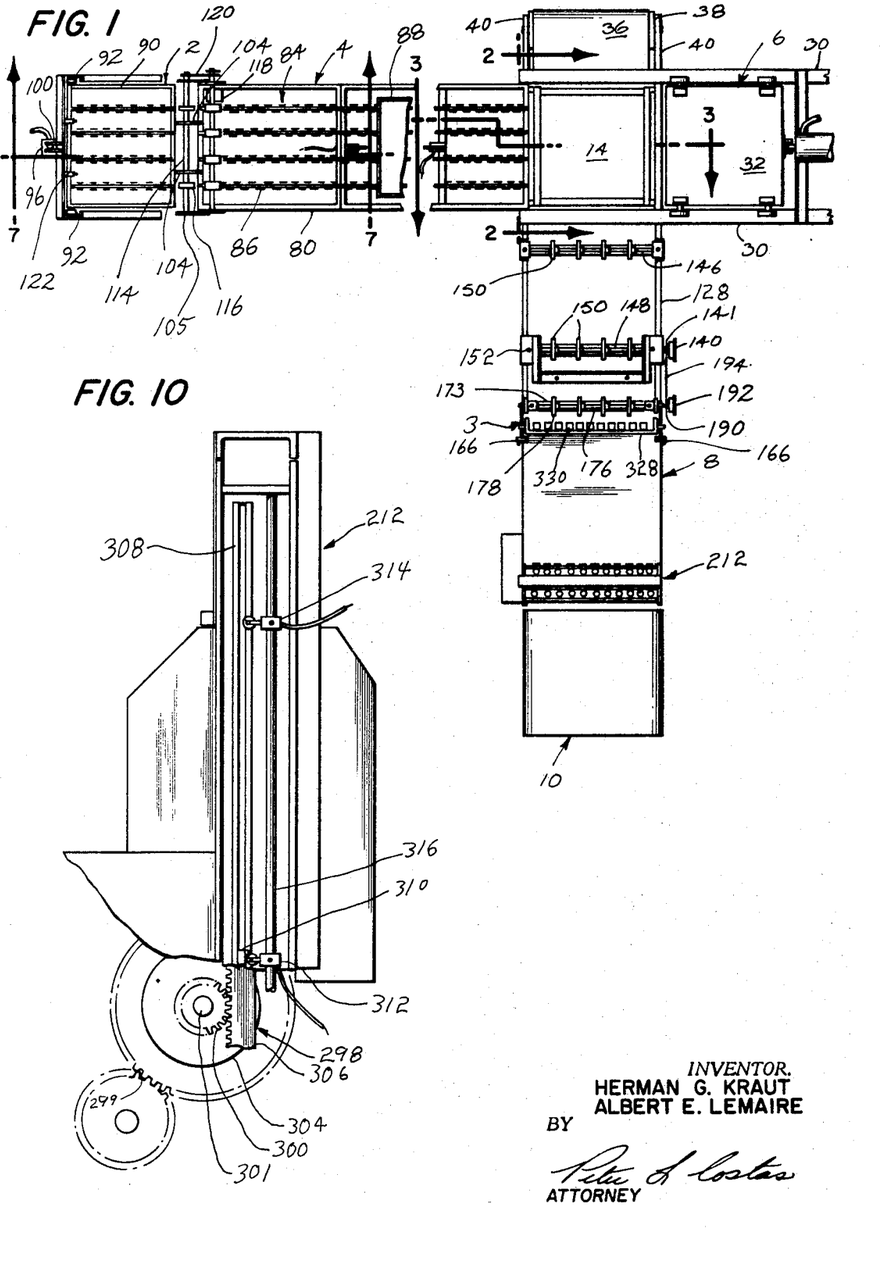
FIGURE 1 is a fragmentary plan view of a packaging installation embodying the present invention.
FIGURE 10 is a fragmentary front elevational view to an enlarged scale of a portion of the transfer and cutting section with the housing for the sequence controlling mechanism removed.

The shaft 235 is driven by the motor 292 through the magnetic clutch 294 and drive chain 296 and the shaft 282 is simultaneously driven by reason of the sprocket chain 284 extending between the shafts 282, 235. Rotation of the drive shaft 235 operates a stroke control assembly generally designated by the numeral 298 for controlling the operation of the cutting assembly 248. The major operating elements of the control assembly 298 are best seen in FIGURE 10 wherein the side cover of the frame 156 and superstructure 212 has been removed. The gear 299 on the shaft 235 meshes with the large gear 302 which in turn drives the shaft 301 of the pinion gear 300 through the magnetic clutch 304. Meshing with the pinion gear 300 is an elongated geared rod or rack 306 which is slidably mounted in a track 308 on the superstructure 212 and has a finger 310 mounted thereon adjacent its upper end. As the pinion gear 300 rotates, it causes the rack 306 to climb within the track 308 and the finger 310 thereon strikes the limit switches 312, 314 which are adjustably mounted on the support rod 316.

When the finger 310 first strikes the limit switch 312, the magnetic clutch 294 is actuated to stop the roll 234 and advance of the packaging assembly. Simultaneously, the air cylinder 258 is actuated to perform the first cut of the packaging assembly so as to effect trimming adjacent the leading edge, and the impulse disengages the magnetic clutch 304. The shaft 301 is connected to a spring motor 303 which is tensioned by rotation of the pinion gear 300 to elevate the rack 306 so that, upon disengagement of the clutch 304, the rack 306 is rapidly returned thereby to initial lowered position. The operating circuit (not shown) includes a counting section for impulses from the limit switch 312 to prevent disengagement of the magnetic clutch 304 for a predetermined number of impulses to enable the rack 306 to move the finger 310 thereby and upwardly to the limit switch 314.

The switch 314 is adjusted to the length of the individual packages and operates the air cylinder 258 for cutting the length of the first package from the packaging assembly while disengaging the magnetic clutch 294 to stop the advance of the packaging assembly and the clutch 304 so as to allow the rack 306 to be returned to initial lowered position. This operation is repeated for a predetermined number of cuts sufficient to sever the individual packages of the packaging assembly and to trim the rear edge thereof. After this cycle, the counting section of the circuit again allows an impulse from the limit switch 312 to effect the first trimming cut on a subsequent packaging assembly.

It will be apparent that various lengths of cuts and numbers of cuts may be made in this manner or by timing cams or by other suitable means which will program the operation of the cutting assembly 248. In the illustrated apparatus, the movement of the rack 306 and thereby the spacing of the cutting strokes are directly controlled by the rotation of the shaft 235 so that it acts as a distance or linear metering means through the large gear 302.

The individual packages which are thus severed by the cutting assembly 248 are advanced by the pressure applying rolls 278 and 280 and discharged onto the moving belt 318 of the conveyor 10. The belt 318 extends about rolls 320 mounted on shafts 322 which are rotatably supported in the frame 324 and are driven by suitable drive means (not shown). The individual packages may be carried by the conveyor 10 to a loading station, storage area or automatic packaging device as may be desired.

On occasion it may be desired to effect punching of holes at both ends of the individual packages and, for this purpose, the punching assembly 326 is provided on the slitter frame 156 adjacent the roll support 164. To enable adjustable positioning of the punching assembly 326 along the length of the slitter frame 156, it is slidably mounted on tracks 327 below the rails 162 and is locked in adjusted position thereon by fasteners (not shown). As best seen in FIGURE 1, the punching assembly 326 has a cross bar 328 upon which are mounted a plurality of air cylinders 330 which have punches (not shown) at the lower end of the pistons (not shown) thereof and a bed plate 332 which adjustably supports die blocks 334 with cooperating apertures formed therein.

Figure 4:
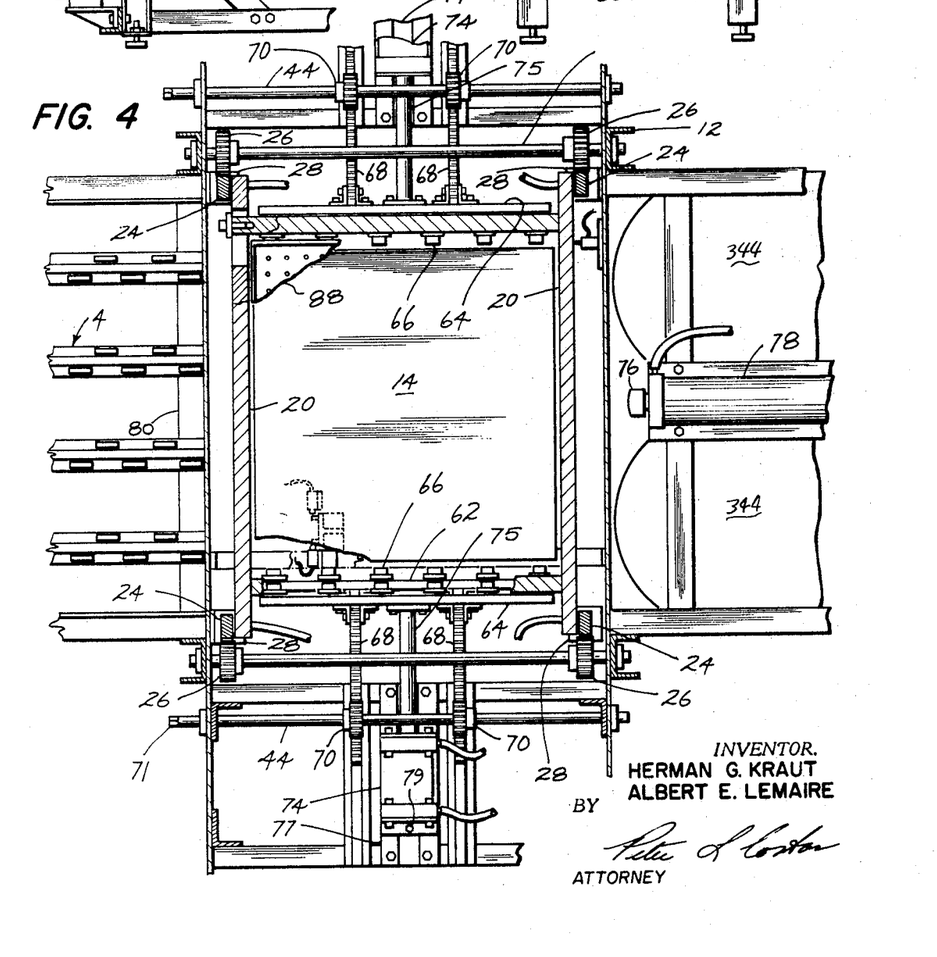
FIGURE 4 is a fragmentary sectional view along the line 4—4 of FIGURE 2 with portions of the tray member and platen broken away for clarity of illustration and with one of the upper guide supports in retracted position.

A housing 336 on the transfer frame 127 adjacent the thermal apparatus 6 contains various elements of electrical circuitry, switches, timers, gauges and other elements of the controls for the thermal apparatus 6 and the transfer portion of the cutting and trimming section 8. The housing 338 on the slitter frame 156 contains various elements of the electrical circuitry, switches, timers, gauges and other elements of the controls for the air cylinders and motors of the cutting and slitting elements of the cutting and trimming section 8. As will be readily apparent to persons having ordinary skill in the art, the circuitry of the several sections may be interlocked so that a failure in any section of the apparatus will automatically terminate operation of the remaining sections. As seen in FIGURES 3 and 4, tanks 344 under vacuum are provided to the rear of the thermal apparatus 6 and are alternately evacuated by a suitable vacuum pump. One or more lines of pressurized air are connected to the various air cylinders by suitable hoses through valves which are actuated and controlled by the various control elements and by suitable hand controls where desired.

Referring now in detail to the operation of the installation, a tray member 88 has placed thereon a porous paperboard substrate 340 at the end adjacent the elevator section 2. When locating members such as pins are provided on the tray member 88, the substrate 340 and tray members 88 are passed under the rubber roll 126 which applies pressure sufficient to cause the locating members to project upwardly through the paperboard substrate 340. The individual articles 342 to be packaged are located upon the upper surface of the substrate 340 in the desired position and the tray member 88 is advanced along the upper conveyor track 84 striking the switch 124 to actuate the cylinder 96 and lower the elevator platform 90 to the level of the lower conveyor track 82 and to depress the stop assembly 102 to the position shown in FIGURE 7. The tray member 88 continues along the track 82 and onto the guide rollers 66 of the upper guide bars 64 in the thermal apparatus 6.

At the start of the cycle, film 36 from the supply roll 38 has been clamped between the clamping elements 20, 22 in a position overlying the packaging subassembly and the heater 32 is advanced by the piston 34 into a position overlying the clamping element 22 and is actuated so as to heat the film 36 to plasticity. Depending upon the length of the heating cycle employed, the cylinder 18 which operates the platen 14 is actuated so as to elevate the tray member 88 and the packaging subassembly thereon upwardly into the clamping element 20 and slightly thereabove so as to ensure firm sealing as suction is drawn through the line 42. Since the tray member 88 is air-pervious as is the substrate 340, the air between the substrate 340 and the thermoplastic film 36 is evacuated so that the film 36 is drawn downwardly about the articles 342 and into bonding engagement with the upper surface of the substrate 340, thus providing a relatively tight-fitting sheath about the articles 342.

After the suction and heating cycle has been completed, the circuit for the thermal apparatus operates the air cylinder 18 so as to cause the platen 14 to be lowered. As the platen 14 is lowering the cam pin 50 strikes the microswitch 54 which sends an impulse to the clutch 140 which begins driving the rolls 136, 137 so as to apply tension to the film 36 outwardly of the clamping elements 20, 22. The roll 173 is normally continuously rotating. Shortly thereafter the camming plate 52 strikes the microswitch 58 causing an impulse to be transmitted to the valve controlling the air supply for the cylinders 28, and air is supplied thereto so as to rapidly elevate the clamping elements 22 and release the film 36 and the packaging assembly from therebetween. Since the film 36 has been tensioned outwardly of the clamping elements 20, 22, the packaging assembly and film 36 are rapidly drawn outwardly from the clamping element 20 and onto the cutting and trimming section 8.

During the continuing downward movement of the platen 14, the cam plate 52 strikes the microswitch 60 which actuates the valve controlling the air supply for the air cylinders 74 causing the upper support bars 64 to be retracted to inoperative position, thus enabling the platen 14 to lower the tray member 88 past the upper guide bars 64 and downwardly onto the guide rollers 66 of the lower guide bars 62. As the platen 14 lowers the tray member 88 onto the lower guide bars 62, the cam pin 50 strikes the microswitch 56 sending an impulse to the valve controlling the air supply for the cylinders 74 so as to return the upper guide bars 64 to operative position. Contemporaneously, the platen 14 strikes the microswitch 61 which is seen in FIGURE 3 which sends an impulse to the valve controlling the air supply for the cylinder 78 to cause the pusher bar 76 to be extended and to thereby discharge the tray member 88 from the rollers 66 of the lower guide bars onto the lower conveyor track 82.

As the tray member 88 proceeds along the lower conveyor track 82, it strikes the switch 125 which actuates the valve for the cylinder 78 causing the pusher bar 76 to be retracted to inoperative position. During its further movement down the conveyor track it passes over the stop assembly 102 and onto the elevator platform 90. The driven wheels 116 slow the tray member 88 as it passes thereover and positively drive it against the switch 122 which then actuates the valve supplying air to the cylinder 96 to elevate the platform 90 to the level of the upper conveyor track 84 for reloading and a new cycle. In this manner, the tray member 88 is positioned properly and prevented from bouncing away from the proper position.

Simultaneously with the return of the tray member 88, the packaging assembly is being advanced along the cutting and trimming section by the pressure of the several pressure roll assemblies thereof which are engaged with the thermoplastic film or packaging assembly as the case may be. As the trailing edge of a packaging assembly passes beyond the switch 210, current is supplied to the wire-like member 204 to heat it for cutting the thermoplastic film between the packaging assembly, the clutch (not shown) on the shaft 172 is actuated to stop rotation of the roll 173 and forward movement of the packaging assembly and the valve supplying air to the piston 208 is actuated to cause the piston to lower the mounting bar 202 and wire-like member 204 into the slot 206, thus severing the film 36 between packaging assemblies.

The clutch on the shaft 172 is reengaged and the severed packaging assembly is moved along the platform 236 by the rolls 173, 178 until the leading edge thereof strikes the finger 244 of the sensing unit or switch 240. This movement pivots the finger 244 and opens the contacts to actuate the circuit including the electric motor 292 causing the rolls 234 and 280 to begin rotation. As the rolls 234, 280 rotate and the packaging assembly passes into the nip between the roll 234 and slitter discs 224, the packaging assembly is slit longitudinally.

The rotation of the shaft 235 simultaneously produces rotation of the pinion gear 300 causing the rack 306 to be elevated until the finger 310 strikes the limit switch 312. At this point, the circuit operates the magnetic clutches 304 and 294, stopping the rotation of the roll 234 and therefore the advance of the packaging assembly through the superstructure 212 at a point where the leading edge of the packaging assembly has passed somewhat beyond the shearing surface 264. Due to the disengagement of the magnetic clutch 304, the rack 306 is returned to initial position as hereinbefore described. The circuit also actuates the valve controlling the air supply to the air cylinder 258 causing the piston 265 to drive the cutting assembly 248 downwardly so that the punches 252 punch out holes in the desired location and the cutting blade 250 trims the front or leading edge of the assembly.

As the piston 256 is returned to elevated position, the magnetic clutches 294, 304 are reengaged by the circuit, and the roll 234 begins turning again to advance the packaging assembly until it passes into the nip between the roll 280 and pressure wheels 278 which then continue to draw the packaging assembly therebeyond. It will be appreciated that the slitter discs 244 continue to slit the packaging assemblies as they pass thereby. During the rotation of the roll 234, the pinion gear 300 again operates the rack 306 until it now reaches the level of the switch 314 at which time the circuit operated thereby again disengages the magnetic clutches 294, 304 to stop movement of the packaging assembly and operates the piston 258 to perform the first transverse cut of the packaging assembly for purposes of severing single packages. It will be appreciated that the stroke of the cutting assembly 248 also punches the holes adjacent the leading edge of the next set of packages.

This sequence of operations is repeated until the plurality of cuts necessary to sever all the individual packages of the packaging assembly has been achieved. It will be apparent that the roll 280 and pressure wheels 278 draw the last series of packages into the position where the final trim cut adjacent the trailing edge of the packages may be effected and propel the individual packages onto the conveyor 10.

As previously indicated, punching of additional holes may be effected by use of the punching assembly 326 and the operation thereof may be independently controlled by a separate switch or it may be operated simultaneously with the operation of the cutting assembly 248 in the event that the individual packages are of a length that they will extend the length of the adjusted spacing therebetween.

Thus, it can be seen that the present invention provides a highly advantageous packaging installation offering substantially automatic operation so as to permit substantial reduction in the labor required for mass packaging in skin or blister processes. In addition, various components of the installation may be utilized individually or in connection with other types of packaging operations.

Despite the high volume which may be handled by the packaging installation, it is adapted to provide a relatively compact installation which is highly rugged in construction and which is readily adapted to facile modification for different types and sizes of packages. By automatically discharging and returning the air-permeable tray member from the thermal apparatus and elevating it to the level of the feed conveyor, a single operator can perform a number of operations concurrently. In addition, it can be seen that the severing of the packaging assembly into the individual packages including the trimming of front and rear edges is automatically performed and is capable of achieving a high degree of accuracy. In addition, the individual packages may be discharged onto a take-off conveyor which may feed an automatic loading or cartoning installation.

Having thus described the invention, we claim:

1. In a packaging installation, the combination comprising: a thermal packaging unit having a platen which may be elevated and lowered between upper, lower and intermediate positions, means for supporting a length of synthetic thermoplastic sheet material adjacent its margins in a position overlying said platen in the elevated position thereof, a heating unit above said sheet material supporting means for heating the sheet material to plasticity, means for drawing suction through said platen so that sheet material in said sheet material supporting means which has been heated to plasticity may be deformed about articles supported on an air-pervious substrate carried by an air-pervious tray member on said platen to provide a packaging assembly, first guide means registering with said intermediate position of said platen for supporting a tray member thereon and second guide means registering with the lowered position of said platen for supporting a tray member thereon, means for moving said first guide means to an inoperative position and means adjacent the lower position of said platen and said second guide means for discharging a tray member from said second guide means; a conveyor assembly including an upper track registering with said first guide means for supplying a tray member to said first guide means of said thermal apparatus, a lower conveyor track registering with said second guide means for receiving a tray member discharged from said thermal apparatus and returning the tray member to the opposite end thereof, and an elevator at the end of said conveyor assembly opposite from said thermal apparatus, said elevator having a platform movable between said lower track and upper track for elevating a tray member returned by said lower track to the level of said upper track; a conveying and cutting assembly including means for withdrawing a packaging assembly from said thermal apparatus and advancing the packaging assembly along the length thereof, first cutting means for severing the sheet material between individual packaging assemblies, a plurality of rotatable slitting members for slitting the packaging assembly along its length as it is advanced thereby and second cutting means for making at least one cut transversely of a packaging assembly passing therealong; means for operating the various elements of said installation; and control means for said operating means to operate the elements of the installation.

2. The packaging installation of claim 1 wherein said operating means includes a drive unit to operate said means for moving said first guide means to an inoperative position and wherein said control means includes a sensing unit actuatable by movement of said platen for operating said drive unit.

3. The packaging installation of claim 1 wherein said operating means includes a drive unit to operate said means for discharging a tray member supported on said second guide means and wherein said control means includes a sensing unit actuatable by movement of said platen to operate said drive unit to discharge a tray member.

4. The packaging installation of claim 2 wherein said sensing unit includes a pair of switches, one of said switches being actuated by said platen to move said guide means to inoperative position, and the second set of switches being actuated by movement of said platen to return said guide means to operative position.

5. The packaging installation of claim 3 wherein said means for discharging a tray member also includes a sensing unit on said lower track actuatable by a tray member passing therealong to return said drive unit to inoperative position.

6. The packaging installation of claim 1 wherein said control means includes a sensing unit on the upper track actuatable by a tray member passing therealong to lower said elevator to the level of said lower track.

7. The packaging installation of claim 1 wherein said control means includes a sensing unit on said elevator actuatable by a tray member carried thereonto by said lower track to raise said elevator platform from the level of said lower track to the level of said upper track.

8. The packaging installation of claim 1 wherein said conveyor assembly includes a stop assembly pivotably mounted thereon at the end of said lower conveyor track adjacent said elevator, said stop assembly being biased upwardly and having means thereon for engaging a tray member returned along said lower conveyor track in the upwardly biased position thereof to prevent movement of the tray member thereby, said stop assembly having means thereon engageable by said elevator platform during the lowering thereof to depress said stop assembly against the biasing pressure and to render said tray engaging means inoperative to permit a tray member to pass thereover and onto said elevator platform.

9. The packaging installation of claim 8 wherein said stop assembly includes at least one driven roll frictionally engageable with the bottom of a tray member passing thereover to drive the tray member onto the platform of said elevator into predetermined position.

10. The packaging installation of claim 1 wherein said means for withdrawing and advancing a packaging assembly includes a plurality of pressure roll assemblies spaced therealong, each of said assemblies including a pair of overlying shafts, a base roll carried by the lower of said shafts and a plurality of pressure rolls spaced along the length of the upper of said shafts and adapted to engage the upper surface of the packaging assembly between the articles thereof, at least one of said shafts being driven.

11. The packaging installation of claim 10 wherein said pressure rolls are adjustably mounted on said upper shaft and wherein each of said pressure roll assemblies includes means for varying the pressure upon said upper shaft and thereby upon the packaging assemblies passing therethrough.

12. The packaging installation of claim 1 wherein said control means is operable to initiate operation of said means for withdrawing a packaging assembly to pretension the sheet material extending therethrough from said thermal apparatus prior to operation of said sheet material supporting means to release the sheet material from engagement therewith, thus causing the sheet material to be rapidly drawn towards the withdrawing means of the conveyor and cutting assembly upon operation of the sheet material supporting means to effect disengagement of the sheet material and thereby the packaging assembly.

13. The packaging installation of claim 10 wherein at least one of said pressure roll assemblies is adjustable in spacing along the length of said conveyor and cutting assembly relative to another of said pressure roll assemblies to accommodate variations in length of the packaging assemblies passing therealong.

14. The packaging installation of claim 1 wherein said first cutting means includes a platform having an aperture extending transversely of said conveying and cutting apparatus, a wire-like member extending across said conveying and cutting apparatus above said platform, means for heating said wire-like member to a temperature sufficient to cut thermoplastic material and means for depressing said wire-like member into said aperture, whereby said wire-like member will cut through thermoplastic sheet material between individual packaging assemblies.

15. The packaging installation of claim 14 wherein said control means includes a sensor on said conveying and cutting apparatus actuatable by a packaging assembly passing therealong to depress said wire-like member into said aperture.

16. The packaging installation of claim 1 wherein said control means includes a sensor on said cutting and conveying apparatus adjacent said slitting members to effect rotation thereof.

17. The packaging installation of claim 1 wherein said means for withdrawing a packaging assembly and advancing the packaging assembly includes a pressure roll assembly to the side of said slitting members and second cutting means opposite from said thermal apparatus, said pressure roll assembly being engageable with packaging assemblies passing through said slitting members and second cutting means to draw the packaging assemblies outwardly therefrom and enable automatic trimming of the trailing edge thereof by said second cutting means.

18. The packaging installation of claim 1 wherein said control means includes sensing means responsive to passage of a packaging assembly along said conveying and cutting apparatus to effect an initial trimming cut by said second cutting means adjacent the leading edge of the packaging assembly and a plurality of cuts along the length of the packaging assembly at predetermined intervals.

19. In a packaging installation, the combination comprising: a thermal packaging unit having a platen which may be elevated and lowered between upper, lower and intermediate positions, means for supporting a length of synthetic thermoplastic sheet material adjacent its margins in a position overlying said platen in the elevated position thereof, a heating unit above said sheet material supporting means for heating the sheet material to plasticity, means for drawing suction through said platen so that sheet material in said sheet material supporting means which has been heated to plasticity may be deformed about articles supported on an air-pervious substrate carried by an air-pervious tray member on said platen to provide a packaging assembly, first guide means registering with said intermediate position of said platen for supporting a tray member thereon and second guide means registering with the lowered position of said platen for supporting a tray member thereon, and means for moving said first guide means to an inoperative position; a conveyor assembly including an upper track registering with said first guide means for supplying a tray member to said guide means of said thermal apparatus, a lower conveyor track registering with said second guide means for receiving a tray member discharged from said thermal apparatus and returning the tray member to the opposite end thereof, and an elevator at the end of said conveyor assembly opposite from said thermal apparatus, said elevator having a platform movable between said lower track and upper track for elevating a tray member returned by said lower track to the level of said upper track; means for operating the various elements of said installation; and control means for said operating means to operate the elevator and elements of the thermal apparatus, said operating means including a drive unit to operate said means for moving said first guide means to an inoperative position and said control means including a first sensing unit actuatable by movement of said platen for operating said drive unit and a second sensing unit actuatable by movement of said platen to return said guide means to operative position.

20. The packaging installation of claim 19 wherein said thermal apparatus includes means adjacent the lower position of said platen and said second guide means for discharging a tray member from said second guide means onto the lower conveyor track, said operating means including a drive unit to operate said discharging means and wherein said control means controls a first sensing unit actuatable by movement of said platen to operate said drive unit to discharge a tray member onto said platen and a second sensing unit on said lower conveyor track actuatable by a tray member passing therealong to return said drive unit to inoperative position.

21. The packaging installation of claim 19 wherein said control means includes a first sensing unit on the upper conveyor track actuable by a tray member passing therealong to lower said elevator to the level of said lower track and a second sensing unit on said elevator actuatable by a tray member carried thereonto by said lower track to raise said elevator platform from the level of said lower track to the level of said upper track.

22. The packaging installation of Claim 19 wherein said conveyor assembly includes a stop assembly pivotably mounted thereon at the end of said lower conveyor track adjacent said elevator, said stop assembly being biased upwardly and having means thereon for engaging a tray member returned along said lower conveyor track in the upwardly biased position thereof to prevent movement of the tray member thereby, said stop assembly having means thereon engageable by said elevator platform during the lowering thereof to depress said stop assembly against the biasing pressure and to render said tray engaging means inoperative to permit a tray member to pass thereover and onto said elevator platform, said stop assembly having at least one driven roll frictionally engageable with the bottom surface of a tray member passing thereover to drive the tray member onto the platform of said elevator into predetermined position.

23. In a packaging installation, the combination comprising: a thermal packaging unit having a platen which may be elevated and lowered and releasable means for clamping a length of synthetic plastic sheet material adjacent its margins in a position overlying said platen in the elevated position thereof; a conveying and cutting assembly including a plurality of pressure roll assemblies for withdrawing a packaging assembly from said thermal apparatus and advancing the packaging assembly along the length thereof, first cutting means for severing the sheet material between individual packaging assemblies, a plurality of rotatable slitting members for slitting the packaging assembly along its length as it is advanced thereby and second cutting means for making at least one cut transversely of a packaging assembly passing therealong, said pressure roll assemblies each including a pair of shafts, a base roll carried by the lower of said shafts and a plurality of pressure rolls spaced along the length of the upper of said shafts and adapted to engage the upper surface of the packaging assembly between the articles thereof, at least one of said shafts being driven; means for operating the various elements of said installation; and control means for said operating means to operate the elements of the installation.

24. The packaging installation of claim 23 wherein said control means is operable to initiate operation of said pressure roll assemblies to pretension the sheet material extending therethrough from said thermal apparatus prior to release of the sheet material clamping means, thus causing the sheet material to be rapidly drawn from the clamping means and onto the conveying and cutting assembly upon release of the clamping means to effect disengagement of the sheet material and thereby the packaging assembly formed therewith.

25. The packaging installation of claim 23 wherein at least one of said pressure roll assemblies is adjustable in spacing along the length of said conveyor and cutting assembly relative to another of said pressure roll assemblies to accommodate variations in length of the packaging assemblies passing therealong.

26. The packaging installation of claim 23 wherein said first cutting means includes a platform having an aperture extending transversely of said conveying and cutting apparatus, a wire-like member extending across said conveying and cutting apparatus above said platform, means for heating said wire-like member to a temperature sufficient to cut thermoplastic material and means for depressing said wire-like member into said aperture, whereby said wire-like member will cut through thermoplastic sheet material between individual packaging assemblies.

27. The packaging installation of claim 23 wherein said control means includes a sensor on said conveying and cutting apparatus actuatable by a packaging assembly passing therealong to depress said wire-like member into said aperture.

28. The packaging installation of claim 23 wherein said control means includes a sensor on said cutting and conveying apparatus adjacent said slitting members to effect rotation thereof.

29. The packaging installation of claim 23 wherein a pressure roll assembly is disposed to the side of said slitting members and said second cutting means opposite from said thermal apparatus, said pressure roll assembly being engageable with packaging assemblies passing through said slitting members and second cutting means to draw the packaging assemblies outwardly therefrom and enable automatic trimming of the trailing edge thereof by said second cutting means.

30. The packaging installation of claim 23 wherein said control means includes sensing means responsive to passage of a packaging assembly along said conveying and cutting apparatus to effect an initial trimming cut by said second cutting means adjacent the leading edge of the packaging assembly and a plurality of cuts along the length of the packaging assembly at predetermined intervals.

31. In a packaging installation, the combination comprising: a thermal packaging unit having a platen which may be elevated and lowered between upper, lower and intermediate positions, means for supporting a length of synthetic thermoplastic sheet material adjacent its margins in a position overlying said platen in the elevated position thereof, a heating unit above said sheet material supporting means for heating the sheet material to plasticity, means for drawing suction through said platen so that sheet material in said sheet material supporting means which has been heated to plasticity may be deformed about articles supported on an air-pervious substrate carried by an air-previous tray member on said platen to provide a packaging assembly, first guide means registering with said intermediate position of said platen for supporting a tray member thereon and second guide means registering with the lowered position of said platen for supporting a tray member thereon, means for moving said first guide means to an inoperative position, means adjacent the lower position of said platen and said second guide means for discharging a tray member from said second guide means onto a lower conveyor track; a conveyor assembly including an upper track registering with said first guide means for supplying a tray member to said first guide means of said thermal apparatus, a lower conveyor track registering with said second guide means for receiving a tray member discharged from said thermal apparatus and returning the tray member to the opposite end thereof, and an elevator at the end of said conveyor assembly opposite from said thermal apparatus said elevator having a platform movable between said lower track and upper track for elevating a tray member returned by said lower track to the level of said upper track; means for operating the various elements of said installation; and control means for said operating means to operate the elevator and elements of the thermal apparatus, said operating means including a first drive unit to operate said means for moving said first guide means to an inoperative position and a second drive unit for operating said tray member discharging means, and said control means including a first sensing unit actuatable by movement of said platen for operating said drive unit, a second sensing unit actuatable by movement of said platen to return said guide means to inoperative position, a third sensing unit actuatable by movement of said platen to operate said drive unit for said tray member discharging means, a fourth sensing unit on said lower conveyor track actuatable by a tray member passing therealong to return said drive unit for said tray member discharging means to inoperative position, a fifth sensing unit actuatable by a loaded tray member, and a sixth sensing unit on said elevator actuatable by a tray member carried thereonto by said lower track to raise said elevator platform from the level of said lower track to the level of said upper track.

32. The packaging installation of claim 31 wherein said conveyor assembly includes a stop assembly pivotably mounted thereon at the end of said lower conveyor track adjacent said elevator, said stop assembly being biased upwardly and having means thereon for engaging a tray member returned along said lower conveyor track in the upwardly biased position thereof to prevent movement of the tray member thereby, said stop assembly having means thereon engageable by said elevator platform during the lowering thereof to depress said stop assembly against the biasing pressure and to render said tray engaging means inoperative to permit a tray member to pass thereover and onto said elevator platform, said stop assembly having at least one driven roll frictionally engageable with the bottom surface of a tray member passing thereover to drive the tray member onto the platform of said elevator into predetermined position.

33. In a packaging installation, the combination comprising: a thermal packaging unit having a platen which may be elevated and lowered and releasable means for clamping a length of synthetic plastic sheet material adjacent its margins in a position overlying said platen in the elevated position thereof; a conveying and cutting assembly including a plurality of pressure roll assemblies for withdrawing a packaging assembly from said thermal apparatus and advancing the packaging assembly along the length thereof, first cutting means for severing the sheet material between individual packaging assemblies, a plurality of rotatable slitting members for slitting the packaging assembly along its length as it is advanced thereby and second cutting means for making at least one cut transversely of a packaging assembly passing therealong, said pressure roll assemblies each including a pair of shafts, a base roll carried by the lower of said shafts and a plurality of pressure rolls spaced along the length of the upper of said shafts and adapted to engage the upper surface of the packaging assembly between the articles thereof, at least one of said shafts being driven, and one of said pressure roll assemblies being located to the side of said slitting members and second cutting means opposite from said thermal apparatus, said one pressure roll assembly being engageable with packaging assemblies passing through said slitting members and said second cutting means to draw the packaging assemblies outwardly therefrom and enabling automatic trimming of the trailing edge thereof by said second cutting means; means for operating the various elements of said installation; and control means for said operating means to operate the elements of the installation, said control means being operable to initiate operation of said pressure roll assemblies to pretension the sheet material extending therethrough from said thermal apparatus prior to release of the sheet material clamping means, thus causing the sheet material to be rapidly drawn from the clamping means and onto the conveying and cutting assembly upon release of the clamping means to effect its disengagement of the sheet material and thereby the packaging assembly formed therewith.

34. The packaging installation of claim 33 wherein said first cutting means includes a platform having an aperture extending transversely of said conveying and cutting assembly, a wire-like member extending across said conveying and cutting assembly above said platform, means for heating said wire-like member to a temperature sufficient to cut thermoplastic material and means for depressing said wire-like member into said aperture and wherein said control means includes a sensor on said conveying and cutting assembly actuatable by a packaging assembly passing therealong to depress said wire-like member into said aperture, whereby said wire-like member will cut through thermoplastic sheet material between individual packaging assemblies.

35. The packaging installation of claim 33 wherein said control means includes sensing means responsive to passage of a packaging assembly along said conveying and cutting assembly to effect an initial trimming cut by said second cutting means adjacent the leading edge of the packaging assembly and a plurality of cuts along the length of the packaging assembly at predetermined intervals.

36. In a method of packaging, the steps comprising: placing an air-pervious substrate onto an air-pervious support member at a first position, placing articles to be packaged on said substrate, moving said support member along a first path onto an elevatable element, clamping a length of thermoplastic sheet material about its margins in a position overlying said elevatable element and support member, heating said clamped length of thermoplastic film to plasticity, elevating said support member to a position closely underlying said clamped length of thermoplastic film, drawing suction through said support member to draw the thermoplastic film about the articles and into bonding engagement with the substrate to form a packaging assembly, lowering said support member to a position below said first path, discharging said support element from said elevatable member, returning said discharge support element to said first position along a second path below said first path, elevating said discharged support member from the level of its second path to the level of its first path of movement, releasing said clamped length of thermoplastic sheet material and the packaging assembly formed therewith, and advancing said released thermoplastic sheet material and packaging assembly through a series of cutting operations, the first of said cutting operations comprising the severing of said thermoplastic sheet material between adjacent packaging assemblies, another of said cutting operations comprising the longitudinal slitting of said packaging assembly between individual articles thereon and still another of said cutting operations comprising the transverse cutting of said packaging assembly so as to trim the leading and trailing edges thereof and to sever said packaging assembly transversely along its length into individual packages.

37. The method in accordance with claim 36 wherein said thermoplastic sheet material is tensioned outwardly of said clamped length prior to releasing said clamped length so as to rapidly draw said thermoplastic sheet material and packaging assembly to one side of said elevatable element.

38. The method in accordance with claim 36 wherein the transverse cutting operation is conducted simultaneously with a punching operation to punch cutouts in the individual packages.

39. In a method of packaging, the steps comprising: placing an air-pervious substrate onto an air-pervious support member at a first position, placing articles to be packaged on said substrate, moving said support member along a first path onto an elevatable element, clamping a length of thermoplastic sheet material about its margins in a position overlying said elevatable element and support member, heating said clamped length of thermoplastic film to plasticity, elevating said support member to a position closely underlying said clamped length of thermoplastic film, drawing suction through said support member to draw the thermoplastic film about the articles and into bonding engagement with the substrate to form a packaging assembly, lowering said support member to a position below said first path, discharging said support element from said elevatable member, returning said discharge support element to said first portion along a second path below said first path, and elevating said discharged support member from the level of its second path to the level of its first path of movement.

40. In a method of packaging, the steps comprising: clamping a length of thermoplastic sheet materal with an unclamped length extending to one side of said clamped length, forming a packaging assembly including said clamped length of thermoplastic sheet material, an air-pervious substrate and a plurality of articles therebetween, releasing said clamped length of thermoplastic sheet material and the packaging assembly formed therewith, and advancing said released thermoplastic sheet material and packaging assembly through a series of cutting operations, the first of said cutting operations comprising the severing of said thermoplastic sheet materal between adjacent packaging assemblies, another of said cutting operations comprising the longitudinal slitting of said packaging assembly between individual articles thereon and still another of said cutting operations comprising the transverse cutting of said packaging assembly so as to trim the leading and trailing edges thereof and to sever said packaging assembly transversely along its length into individual packages.

41. The method in accordance with claim 40 wherein said unclamped length of thermoplastic sheet material is tensioned prior to release of said clamped length so as to rapidly draw said thermoplastic sheet material and packaging assembly to one side for advancing through said series of cutting operations.

42. The method in accordance with claim 40 wherein the transverse cutting operation is conducted simultaneously with a punching operation to punch cutouts in the individual packages.

43. In a packaging installation, the combination comprising: a thermal packaging unit having a platen which may be elevated and lowered between upper, lower and intermediate positions, a heating unit above said platen to bond synthetic plastic sheet material to an air-pervious substrate to encase articles therebetween and form a packaging assembly, first guide means registering with said intermediate position of said platen for supporting a tray member thereon and second guide means registering with the lowered position of said platen for supporting a tray member thereon, means for moving said first guide means to an inoperative position and means adjacent the lower position of said platen and said second guide means for discharging a tray member from said second guide means; a conveyor assembly including an upper track registering with said first guide means for supplying a tray member to said first guide means of said thermal apparatus, a lower conveyor track registering with said second guide means for receiving a tray member discharged from said thermal apparatus and returning the tray member to the opposite end thereof, and an elevator at the end of said conveyor assembly opposite from said thermal apparatus, said elevator having a platform movable between said lower track and upper track for elevating a tray member returned by said lower track to the level of said upper track; a conveying and cutting assembly including means for withdrawing a packaging assembly from said thermal apparatus and advancing the packaging assembly along the length thereof, a plurality of rotatable slitting members for slitting the packaging assembly along its length as it is advanced thereby, and cutting means for making at least one cut transversely of a packaging assembly passing therealong; means for operating the various elements of said installation; and control means for said operating means to operate the elements of the installation.

44. In a packaging installation, the combination comprising: a thermal packaging unit having a platen which may be elevated and lowered between upper, lower and intermediate positions, a heating unit for bonding thermoplastic sheet material through said platen so that sheet material may be bonded to an air-pervious substrate to provide a packaging assembly carried by an air-pervious tray member on said platen, first guide means registering with said intermediate position of said platen for supportng a tray member thereon and second guide means registering with the lowered position of said platen for supporting a tray member thereon, and means for moving said first guide means to an inoperative position; a conveyor assembly including an upper track registering with said first guide means for supplying a tray member to said first guide means of said thermal apparatus, a lower conveyor track registering with said second guide means for receiving a tray member discharged from said thermal apparatus and returning the tray member to the opposite end thereof, and an elevator at the end of said conveyor assembly opposite from said thermal apparatus, said elevator having a platform movable between said lower track and upper track for elevating a tray member returned by said lower track to the level of said upper track; means for operating the various elements of said installation; and control means for said operating means to operate the elevator and elements of the thermal apparatus, said operating means including a drive unit to operate said means for moving said first guide means to an inoperative position and said control means including a first sensing unit actuatable by movement of said platen for operating said drive unit and a second sensing unit actuatable by movement of said platen to return said guide means to operative position.

45. In a packaging installation, the combination comprising: a thermal packaging unit for producing a packaging assembly having a plurality of articles spaced thereabout; a conveying and cutting assembly including a plurality of pressure roll assemblies for advancing a packaging assembly from said thermal apparatus along the length thereof, a plurality of rotatable slitting members for slitting the packaging assembly along its length as it is advanced thereby and second cutting means for making at least one cut transversely of a packaging assembly passing therealong, said pressure roll assemblies each including a pair of shafts, a base roll carried by one of said shafts and a plurality of pressure rolls spaced along the length of the other of said shafts and adapted to engage the upper surface of the packaging assembly between the articles thereof, at least one of said shafts being driven; means for operating the various elements of said installation; and control means for said operating means to operate the elements of the installation.

References Cited
UNITED STATES PATENTS

Re. 25,466    10/1963    Kostur _______________ 53—112
3,287,877    11/1966    Kostur _______________ 53—112

TRAVIS S. McGEHEE, *Primary Examiner.*